United States Patent [19]

Anderson

[11] 4,294,644

[45] Oct. 13, 1981

[54] SERVO MOTOR CONTROL LABELLER

[75] Inventor: Dale L. Anderson, Mound, Minn.

[73] Assignee: Datafile Limited, Toronto, Ontario, Canada

[21] Appl. No.: 112,341

[22] Filed: Jan. 30, 1980

[51] Int. Cl.³ .............................................. B32B 31/00

[52] U.S. Cl. ..................................... 156/361; 156/363

[58] Field of Search ................................ 156/361-364, 156/540-542, 584

[56] References Cited

U.S. PATENT DOCUMENTS

| | | | |
|---|---|---|---|
| 4,089,725 | 5/1978 | Crankshaw | 156/363 X |
| 4,106,972 | 8/1978 | Caudill | 156/363 |
| 4,183,779 | 1/1970 | Barber et al. | 156/361 |

*Primary Examiner*—David A. Simmons

[57] ABSTRACT

The invention resides in utilizing a servo motor to drive the label feed and employing a control system for the servo motor which is responsive to the rate of feed or speed of the surface to be labelled as it is advanced to the labeller. The control system on receiving an instruct-to-label signal accelerates the servo motor smoothly from zero to the desired labelling speed while the surface to be labelled is advanced toward the labeller a predetermined distance and on receiving an end to labelling signal decelerates the servo motor smoothly from labelling speed to zero while the label feed is advanced a predetermined distance. The arrangement is such that upon an instruct to label signal being fed to the control system at a predetermined position of advance of the surface relative to the labeller the labeller will accelerate a label from a predetermined start position and deliver same to touch down on the surface to be labelled at the precise desired point with the label moving at the same speed as the surface and upon an end to labelling signal generated by a label feed sensor being fed to the control system the labeller will decelerate to bring the next label to be delivered to said predetermined start position in preparation for the next instruct-to-label signal.

48 Claims, 14 Drawing Figures

SERVO MOTOR CONTROL LABELLER

FIELD OF THE INVENTION

This invention relates to novel apparatus for applying labels to a moving surface which may be the surface of an item being fed along a conveyor or the surface of a travelling web, the apparatus providing for high speed precision accuracy of label placement at the desired position on the moving surface. The novel labeller apparatus of the present invention particularly lends itself to automatic labelling where high speed precision labelling in accordance with a predetermined labelling program is desired.

BACKGROUND OF THE INVENTION

As the requirement for more sophisticated labelling grows such as for use with the high speed labelling machine illustrated in U.S. patent application Ser. No. 830,118 now U.S. Pat. No. 4,183,779, the limitations of the prior art automatic labellers with respect to their ability to place the labels with the speed and precision desired and to provide the desired durability in use have become more apparent. Such prior art automatic labellers dispense self-adhesive die cut labels mounted on a carrier web which is drawn from a supply and passed sharply around the smooth end of a peeling surface or splitter tongue which causes the labels to separate from the carrier web. The carrier web is then drawn backwards by a take up e.g. is drawn around a capstan and gripped between the capstan and a pressure roller. The rotation of the capstan effects feed of the labels which move forwardly of the peeling surface while the carrier web is delivered to a take up reel.

The take up or capstan is normally driven either through a friction clutch mechanism or alternatively a particle clutch/brake mechanism used in conjunction with a driving motor and reduction gears. The capstan is started and stopped for each label dispensed or article labelled. The motion is necessarily an instant start/stop operation within the mechanical limitations of the clutch mechanism employed. These limitations translate into limited speed, accuracy and flexibility of label application and limited labeller life. In addition, the labels carried on the backing web are not always precisely spaced and the spacing and variations therein also effect the accuracy and flexibility of the labelling.

The present invention provides a solution to these typical problems of existing labellers.

BRIEF DESCRIPTION OF THE INVENTION

The invention resides in utilizing a servo motor to drive the label feed and employing a control system for the servo motor which is responsive to the rate of feed or speed of the surface to be labelled as it is advanced to the labeller. In particular, the control system on receiving an instruct to label signal accelerates the servo motor smoothly from zero to the desired labelling speed while the surface to be labelled is advanced toward the labeller a predetermined distance and on receiving an end to labelling signal decelerates the servo motor smoothly from labelling speed to zero while the label feed is advanced a predetermined distance. The arrangement is such that upon an instruct to label signal being fed to the control system at a predetermined position of advance of the surface relative to the labeller the labeller will accelerate a label from a predetermined start position and deliver same to touch down on the surface to be labelled at the precise desired point with the label moving at the same speed as the surface and upon an end to labelling signal generated by a label feed sensor being fed to the control system the labeller will decelerate to bring the next label to be delivered to said predetermined start position in preparation for the next instruct to label signal.

The control system according to the invention lends itself to providing precisely accurate labelling control in which for example the accelerator can be made to override the decelerator to apply labels at a closer spacing than would be possible if the labeller had to be brought to a halt between label feeds, and where the spacing of the labels on the backing web is appreciable say $\frac{1}{8}$ of an inch or more the system enables the labels to be applied to the surface at a closer spacing than they occupy in the label backing web.

Further the control system through the use of a label sensor which senses the leading edge of the next label to be dispensed allows precise control of label application whether or not the labels are accurately placed on the backing or whether or not a label is missing on the backing.

Again the control system lends itself to refinements or precise adjustments by interposing adjustable delay circuits between the generated instruct to label signal and the accelerator and the generated end to labelling signal and the decelerator. The former adjustment may be used to compensate for an inaccuracy in the placing of an item to be labelled on a conveyor for feeding same to the labeller. The latter adjustment will control the starting position of the label and hence the distance the label has to travel from the start position to touch down and provides a vernier touch down control.

Further the control system lends itself to computer control so that the instruct to label signals can be delivered from input data stored in the computer in accordance with a predetermined labelling programme or scheme.

DESCRIPTION OF THE DRAWINGS

FIGS. 4 and 5 are enlarged broken away elevational views of the labeller splitter tongue and label roll on assembly showing the application of the label being dispensed onto a file folder or the like;

FIG. 10 is a perspective view of an alternative label supply in which the labels are butt cut on the backing web so that there is only the knife slit separation between;

DETAILED DESCRIPTION

Figure 1:
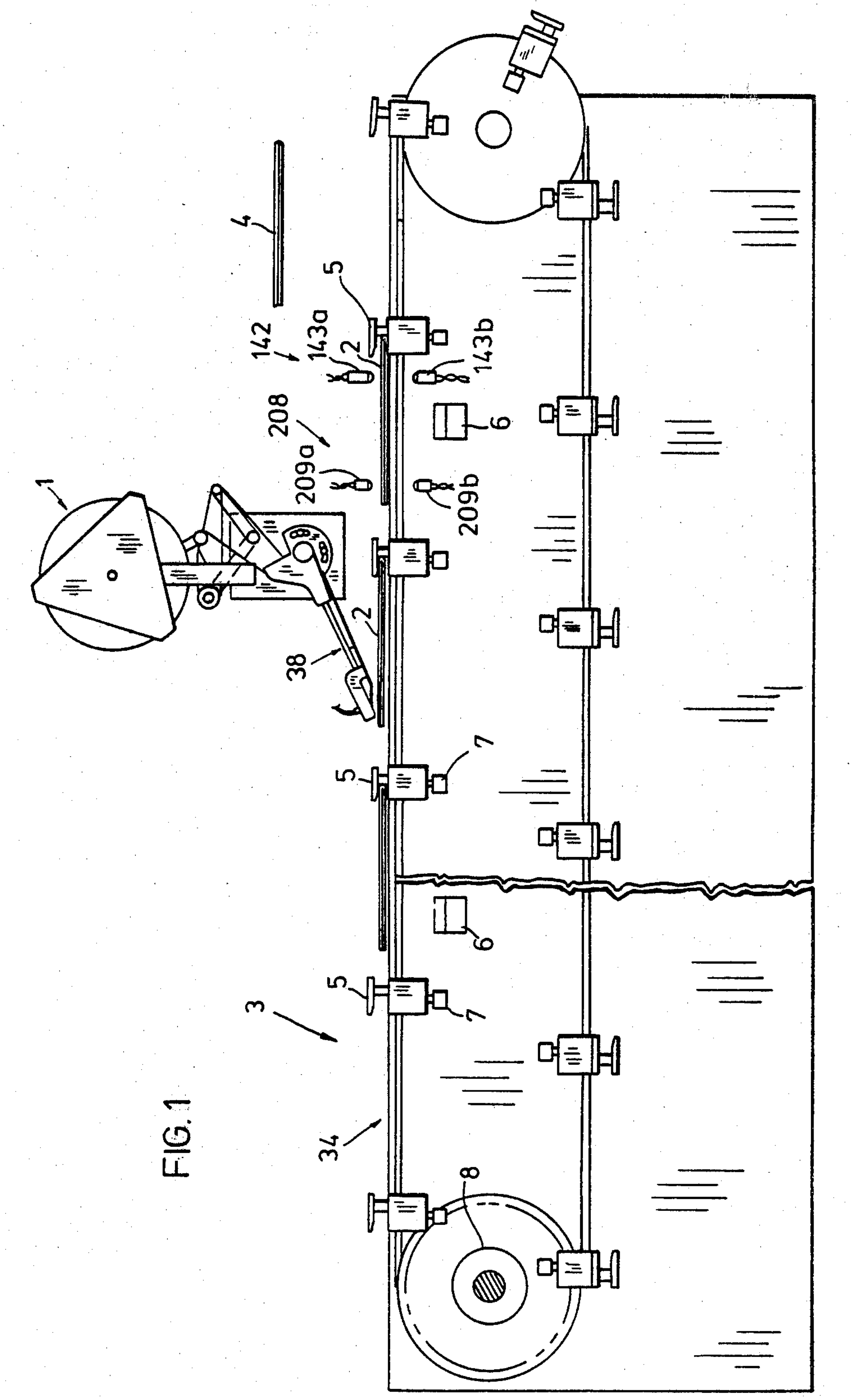
FIG. 1 is a simplified elevational view of labelling apparatus embodying the invention showing the application of the labeller to apply labels to file folders or the like being fed therepast on an endless conveyor.

With reference to FIG. 1 there is shown a labeller generally designated at 1 which is of the type that is rotary driven to dispense labels carried on a backing web onto a moving surface. The labels which have pressure sensitive adhesive backings are dispensed by pulling the backing web around a peeling surface so that the labels which are relatively stiffer than the backing web and which are prevented from firmly adhering to the web by a suitable release backing are separated from the web and delivered down onto the surface being fed therepast.

As illustrated in FIG. 1 the labeller 1 is arranged to apply labels to file folders or the like 2 carried on an endless conveyor shown more or less diagrammatically and generally designated at 3. The folders are fed from a supply represented by the folder 4 disposed above the conveyor and these folders are held onto the conveyor when delivered from the supply by grippers or jaws 5 which are actuated to clamp the folders as they are fed past the labeller 1 and to release the folders for discharge by a suitable camming devices 6 acting on rollers 7 first laterly in one direction for folder clamping and then in the opposite direction for folder release.

It will be understood however that the details of the conveyor are not part of the present invention and for example the conveyor illustrated in the aforesaid U.S. application Ser. No. 830,118 may also be used. It will be understood that, as described in said U.S. application Ser. No. 830,118, a plurality of labellers 1 may be spaced along the conveyor for applying labels to file folders or the like according to a predetermined programmable scheme which is fed into a computer control.

Figure 3:
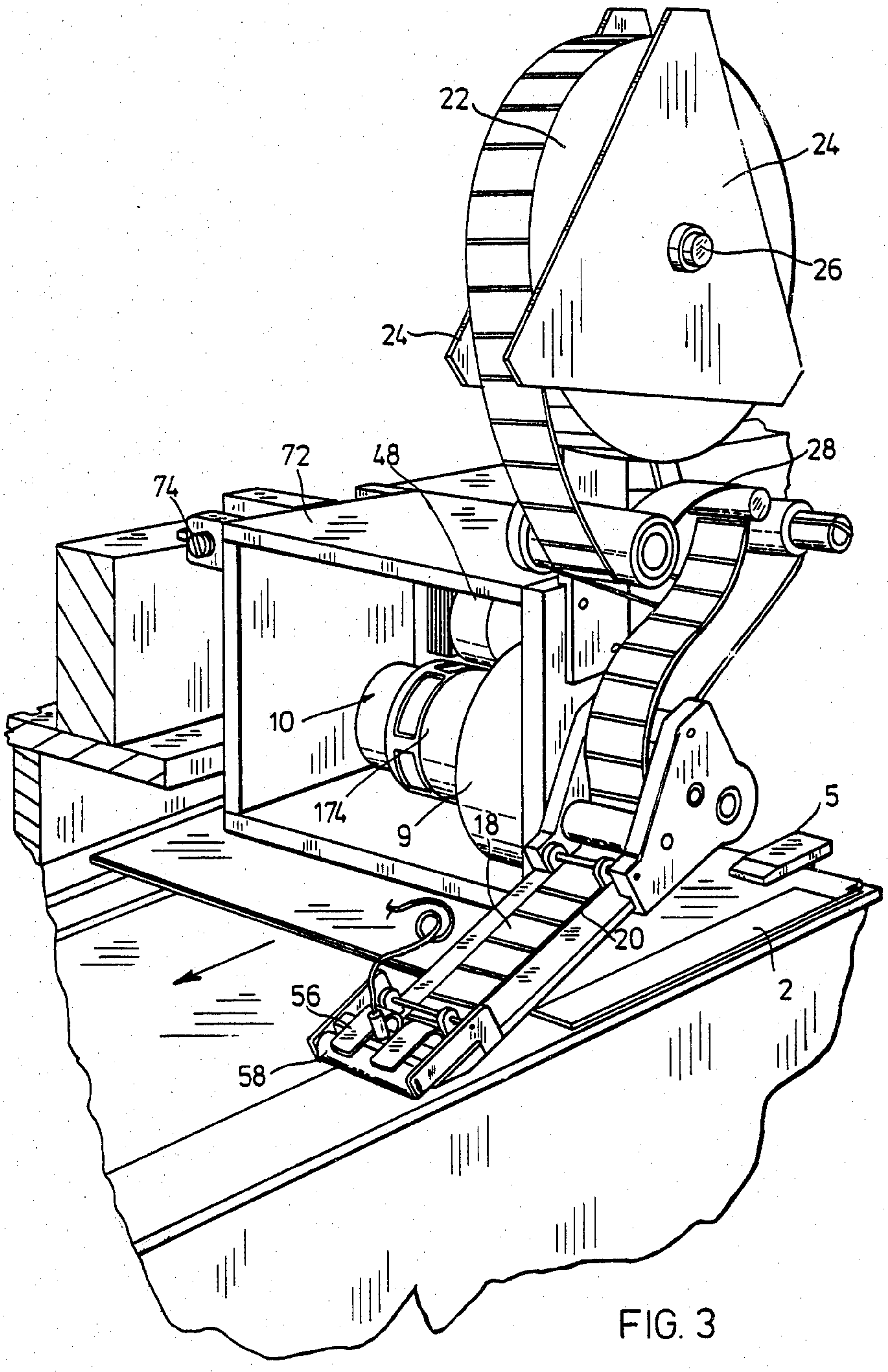
FIG. 3 is a perspective view of the labeller.
Figure 14:
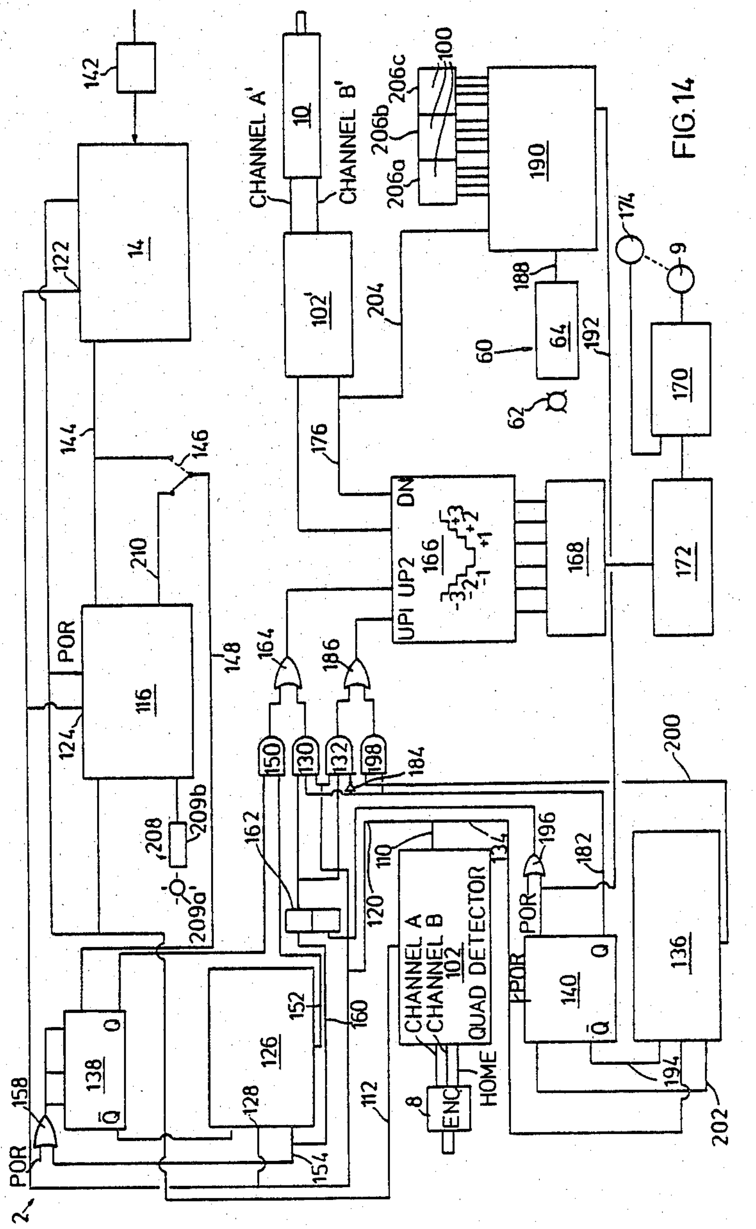
FIG. 14 is a schematic diagram of the control system for the labelling apparatus of the present invention.

The present invention resides in the control of the label feed relative to the feed of the surface to be labelled for precision accuracy high speed labelling. To this end the conveyor 1 drives an encoder or pulse generator 8 and as illustrated in FIG. 3 the labeller 1 is driven by a servo motor 9 which in turn drives an encoder or pulse generator 10. The circuitry generally designated at 12 in FIG. 14 provides the control between the encoder 8 which is driven by the conveyor 1, that is, by the feed of the surface to be labelled and the servo motor 9 and its encoder 10 when an appropriate instruct to label signal is impressed on the circuit. For sophisticated labelling for example, in a labelling machine such as described in said U.S. application Ser. No. 830,118 for which the present labeller and its control are especially suited the instruct to label signal is given by a computer control generally designated at 14 in FIG. 14 where labelling scheme input data can be stored.

Figure 2:
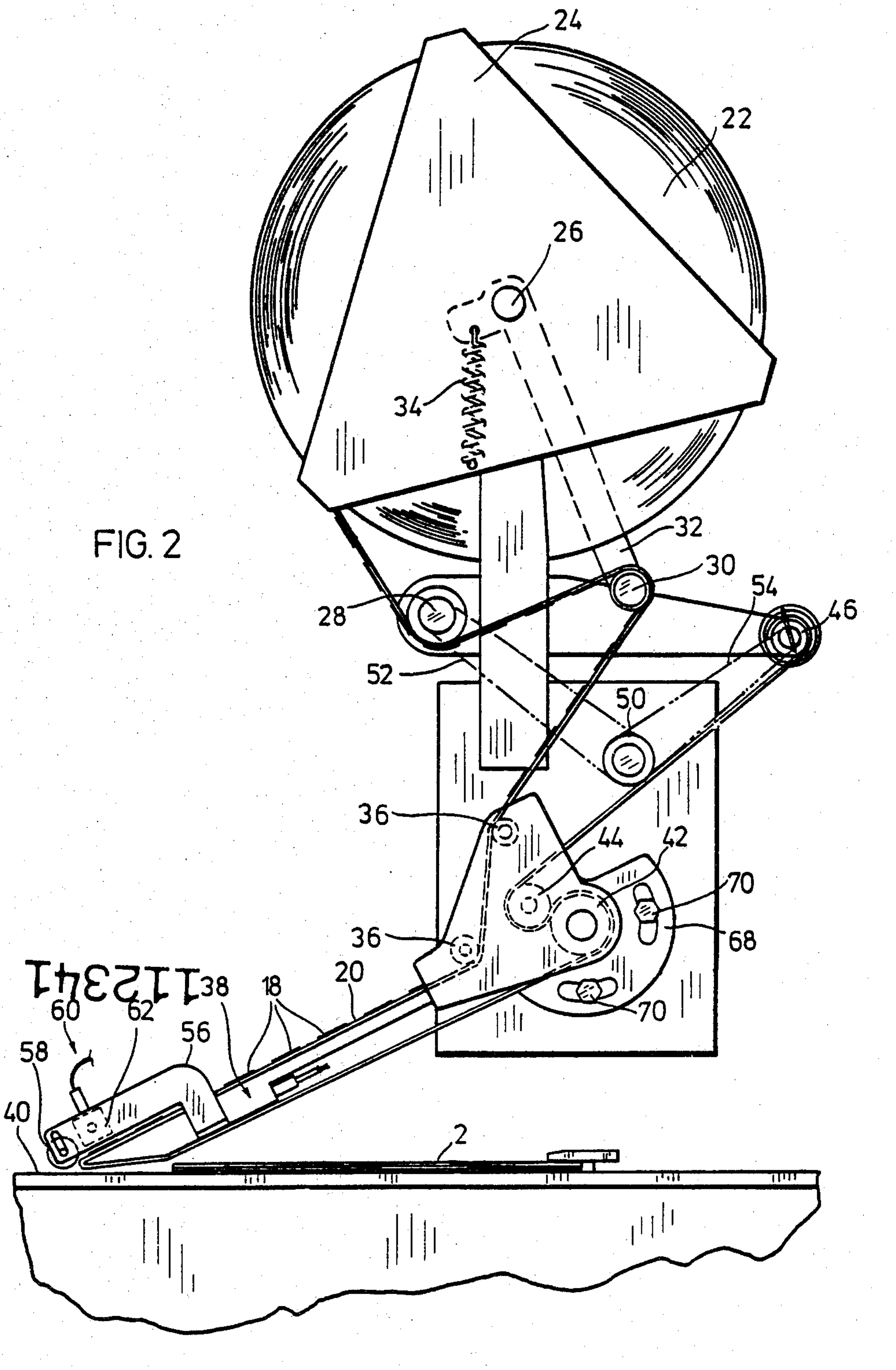
FIG. 2 is an enlarged elevational view of the labeller shown in FIG. 1.

The labeller 1, FIGS. 2 and 3, as previously explained is of the type which is rotary driven to deliver labels having die-cut self-adhesive backings mounted on a backing web by drawing the backing web around a peeling surface causing the relatively stiffer labels to part from the backing and continue on down to the surface to be labelled. The particular labeller illustrated in FIGS. 2 and 3, except insofar as the specifics of the control of its rotary drive are concerned, forms the subject matter of co-pending U.S. application Ser. No. 17,966 filed Mar. 8, 1979.

As illustrated the labels 18 carried in spaced relation on the backing 20 are drawn off a supply roll 22 mounted between side plates 24 and freely rotatable about spindle 26. The web from the supply roll is fed around a feed roll 28 and over a roll 30 carried on a pivotal dancer arm 32 which is biassed by a spring 34 away from the feed roll 28.

The web is then led down between idle rollers 36 then down a guide ramp 38 having a peeling surface or splitter tongue 40 at its extremity forming a sharp curve around which the web is drawn and which effects the separation of the labels 18 from the web.

The web is then led back up underneath the ramp around a capstan 42 which has an knurled surface against which the web is pressed by a pressure roller 44. From the pressure roller the web is led up to a take up spool 46.

The capstan 42 is driven by the servo motor 9 as hereinafter more fully explained. The feed roll which is covered in very soft rubber is driven by a motor 48 which drives a double pulley 50 which drives the feed roll 28 via a rubber belt 52. The take up spool 46 is driven by steel spring belt 54 when slackness in the web span between the capstan pressure roll assembly 42, 44 and the take up spool occurs.

The ramp 38 carries at its lower extremity a bracket 56 carrying a roller 58 which is spring loaded to apply pressure to the label deposited on the surface to be labelled to effect proper contact therebetween.

A sensor device generally designated at 60 is utilized to sense the leading edge of the next to be dispensed label 18 to provide an end-labelling control signal to effect cessation of label feed as hereinafter more fully explained. The sensor device 60 comprises a light source 62 carried by the bracket 56 and the detector 64 mounted in the ramp 38, the detector comprising a bundle of optic fibres 66 exposed to the light source 62 through a suitable slit as shown in FIGS. 4 and 5.

The ramp 38 is mounted on an adjustable bracket 68 rotatable about the axis of the capstan 42, the bracket being clamped in adjusted position by clamp bolts 70. The whole labeller is carried by a housing 72 which is also adjustable relative to the conveyor 3 by suitable adjusting screws 74.

Figure 4:
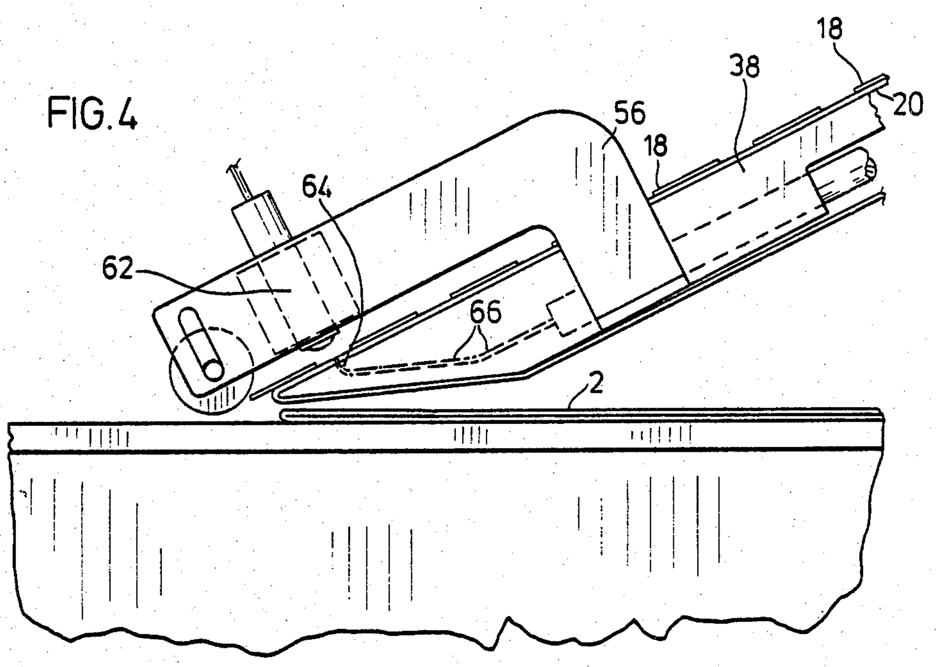

In operation when the servo motor is actuated by the control circuit 12 as hereinafter more fully explained, the capstan 42 is driven to effect drawing of the web 20 around the forward edge of the splitter tongue 40 causing the lowermost label 18 as shown in FIG. 4 for example, to move downwardly from its start position in which the forward edge of the label has already been peeled from its backing. At the same time the conveyor feeds the file folder forwardly beneath the splitter tongue, the arrangement being such that the downwardly fed label will reach the same speed as the file folder which is being advanced by the conveyor so that the label will touch down at the precise desired point on the folder with no relative movement between the label and folder.

Figure 5:
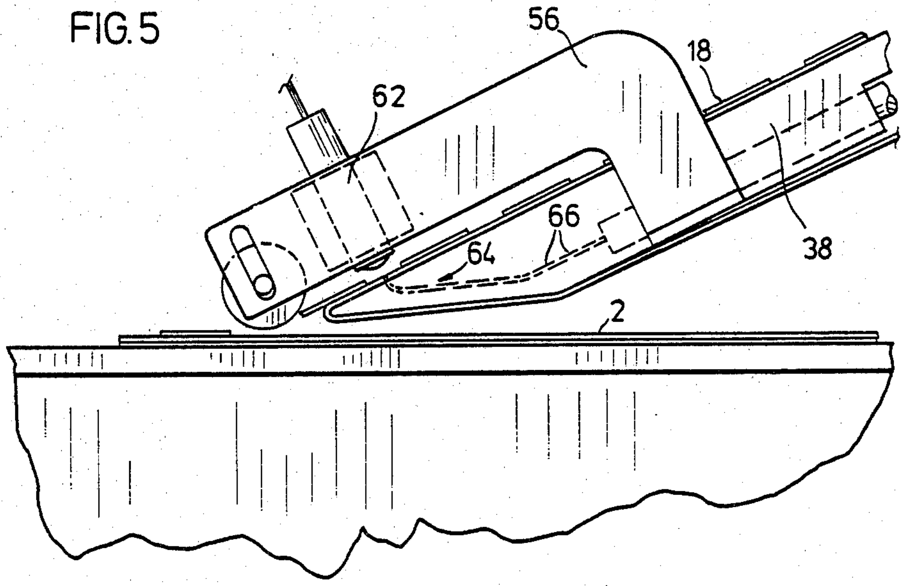

FIG. 5 illustrates the situation where the lowermost label of FIG. 4 has been applied to the file folder and the next subsequent label whose leading edge was sensed by the sensor 60 has been brought to rest following the end-labelling signal from the sensor at the precise same point that was previously occupied by the lowermost label in FIG. 4.

As the web is drawn around the capstan 42, pressure is applied to the dancer roller 32 causing it to move against the bias of its spring 34 increasing web wrap-around about the continuously driven feed roll 28 causing feed of the labels off the supply roll 22. At the same time, web tension between the capstan and its pressure roll and the take up spool 46 is eliminated by the feed of the web and the take up spool will be driven by the spring belt 54 to take up this web slack.

When the demand for the labels ceases the continued movement of the label, the feed roll due to inertia will create a slack between the feed roll 28 and the dancer roll 30 allowing the dancer arm to swing away from the feed roll thereby reducing the wraparound and bringing the supply feed to a halt.

Figure 6:
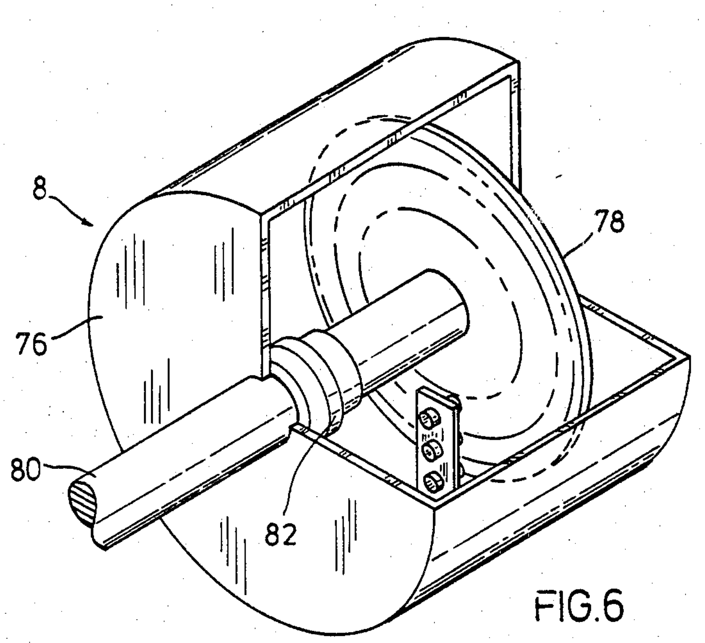
FIG. 6 is a broken away diagrammatic perspective view of one of the encoders, namely, the encoder used for the measurement of the feed of the surface to be labelled.
Figure 8:
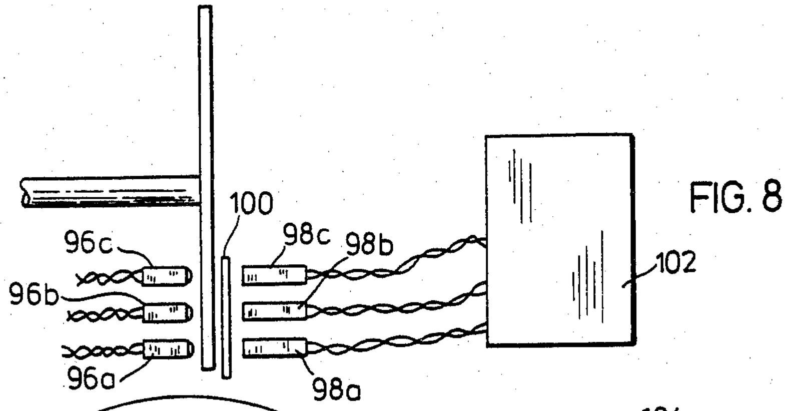
FIG. 8 is a diagrammatic view in elevation illustrating the manner in which the pulses are created upon rotation of the encoder disc of FIG. 7.
Figure 7:
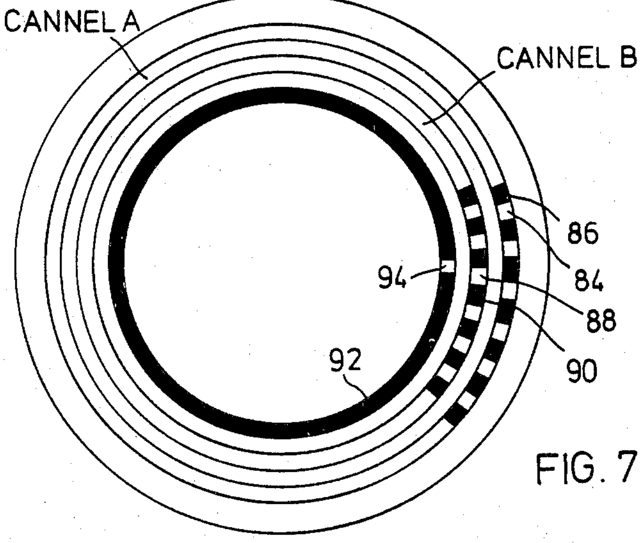
FIG. 7 is an enlarged elevational view of the disc of the encoder of FIG. 6 illustrating the light and dark markings on the A and B channels and the "home" channel.

With reference to FIGS. 6 to 8, the encoder or pulse generator 8 is shown more or less diagrammatically with its casing 76 broken away to show the disc 78 carrying circular patterns of light and dark areas driven by an input shaft 80 supported by the casing 76 through a bearing 82. It will be understood that the input shaft 80 is driven from the means feeding the surface to be labelled which, in FIG. 1, is the endless conveyor 3 which feeds the folders 2.

As shown in FIG. 7, the disc 78 has an outer annular ring of light and dark areas 84 and 86 respectively. This outer ring designated channel A has 3000 light areas and 3000 dark areas.

The next inner ring indicated at channel B similarly has 3000 light areas 88 and 3000 dark areas 90 with the areas of channel being offset from the areas of channel 80 circumferentially so that radially a dark area 90 of channel B overlaps half of the dark area 86 of channel A and half of a light area 84 of channel A and vice versa. In terms of their electrical function the light and dark areas of channel B are displaced 90 electrical degrees from the light and dark areas of channel A.

The innermost ring 92 has a single light area 94 which is intended to produce a "home" signal.

Disposed on one side of the disc 78 in registration with the channels A, B and ring 92 are light sources 96*a*, 96*b*, 96*c*, respectively.

In corresponding registration on the opposite side of the disc 78 are photo sensors 98*a*, 98*b*, 98*c*, respectively and interposed between the light sensors and the disc 78 is an apertured plate indicated at 100 which confines the light passing from the light sources through the light areas of the disc to the sensors to narrow beams for more definite on/off signals at each photo sensor.

Figure 9:
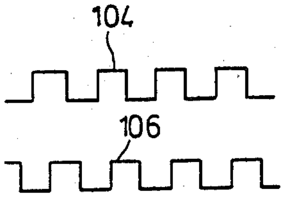
FIG. 9 is a graph illustrating the output pulses from the A and B channels of the encoder disc of FIG. 7.

The output of the sensors 98*a*, 98*b*, 98*c* is fed to a circuit 102 which amplifies and conditions the signals coming from the light sensors. The outputs from sensors 98*a* and 98*b* are illustrated as being pulses which are 90 electrical degrees displaced in FIG. 9, the channel A pulses being indicated at 104 and the channel B pulses being indicated at 106.

It will be appreciated that the pulses 104 are created as the disc 78 is driven to successively bring the light and dark areas between the light source 96*a* and the corresponding sensor 98*a*. Since there are 3000 such areas in one revolution of the disc 78, there will be 3000 pulses 104 generated in the disc revolution. Similarly, there will be 3000 pulses 106 generated in the disc revolution on channel B, whereas there will be single home pulse produced by the light source 96*c* and the sensor 98*c* on one rotation of the disc.

By suming the effect of the pulses with channel A off and channel B on, channel A on, channel B on, channel A on, channel B off, and channel A off, and channel B off, the encoder output can be made to produce four times 3000 pulses, that is, 12,000 pulses from the A and B channels in one revolution of the disc for "quadrature detection". Circuitry indicated at 102 performs this quad detection and outputs 12,000 pulses from encoder 8. Circuit 102 also prevents any interference from any effect of chatter in the encoder disc which would entail backward disc movement as will be understood by those skilled in the art.

In the conveyor illustrated, one revolution of the disc 78 represents 12 inches of conveyor feed so that since the output from the encoder and its associated circuit 102 produces 12,000 pulses per revolution, each encoder output pulse represents a conveyor feed advance of 1/1000ths of an inch. In other words, for each 1000ths of an inch advance of a folder 2 towards the labeller 1, there will be one output pulse or forward count from the encoder through the quad detector and anti-back-up circuit 102. Also of course there will be one "home" output pulse for each encoder revolution.

The encoder or pulse generator 10 driven by the servo motor 9 shown in block form in FIG. 14, is of corresponding construction to the encoder 8 but the home channel or ring 92 is not used and since the feed of the labeller is such that one revolution of the capstan 42 produces a label advance of three inches, channels A′ and B′ are arranged to provide only 1,500 output pulses and a dual detector circuit 102′ is utilized so that for each revolution of the capstan 42, 3000 output pulses are generated and on four revolutions which equates to the travel of the label feed a distance of twelve inches, there will be 12,000 output pulses generated by the circuit 102′. Thus again each output pulse from the encoder 10 through its electronics 102′ represents a label feed advance of 1/1000ths of an inch corresponding to the surface feed advance of 1/1000 ths of an inch per output pulse from the encoder 8.

It will be understood that every label to be placed can be referenced to the home signal produced once each revolution by the encoder 8 with each fresh home signal commencing the start of a fresh labelling cycle. In the conveyor illustrated in FIG. 1, the spacing between the clamps or grippers 5 is twelve inches and the file folders themselves are approximately nine and one-half inches in width, so that if a home pulse is made to coincide with the arrival of the leading edge of the file folder at a point say two and one-half inches in advance of the point at which labels from the labeller touch down, and it is desired that the label actually touch down at a point two and one-half inches behind the leading edge of the file folder, then the label is required to touch down after the file folder has travelled five inches following the delivery of the home pulse. Since each pulse represents 1/1000ths of an inch advance, then the label touch down is required at pulse 5000 less pulses needed for the acceleration ramp as hereinafter explained. The labels for example may be one inch in width and their spacing on the backing web 20 may be say ⅛th of an inch. The next label, of course, cannot be deposited until the first one has been applied so that the conveyor would have to advance one inch or one thousand encoder counts or pulses before the first label was fully deposited on the file folder. If the next label was to be deposited on the file folder one inch spaced from the first label then it would be required to touch down at count 7000. If the spacing were only one-half an inch, touch down would be at count 6500. At a quarter of an inch, touch down would be at count 6250 and at an eighth of an inch spacing the touch down would be at count 6125 etc.

As disclosed, in U.S. application Ser. No. 830,118 where the file folders are to be automatically labelled there will be a series of labellers 1 disposed along the length of the conveyor with each labeller arranged to dispense its particular label. For example, the first labeller could dispense the label with the number 1 on it, the second labeller could dispense labels with the number 2 thereon, etc. Then as a file folder was fed down the conveyor it would have the appropriate labels applied to give the file number in accordance with a predetermined scheme with each labeller being required to deposit a label bearing its number at the appropriate point on the file folder. If for example, labeller 1 were to deposit labels bearing the number 1 and the file folder called for the number of 111,111 then that labeller would apply its one label six times to produce the number.

As illustrated in FIG. 14, a computer controller 14 is provided to receive and store input data comprising the labelling scheme for the plurality of file folders such as described, this input data comprising the information with respect to each file folder as to the count as which the labeller to which the file folder is presented is required to deposit its label according to the scheme. That is, the input data is the touch down count relative to the home count to achieve precision label application at the correct point on the file folder to within an accuracy of 1/1000ths of an inch. It will be appreciated that not only is the label required to touch down at the precise point desired, but that it must also be travelling at the surface speed of the file folder as it touches down so that it will not slip relative thereto, tear or buckle. The circuitry providing this label control is shown in the simplified schematic circuit of FIG. 14 as hereinafter more fully described.

As shown in FIG. 14, the conveyor or surface feed encoder 8 delivers its channel A, channel B and home pulses to a quad detector and antiback-up circuit 102 which as explained produces 12,000 output or forward counts representing 1/1000ths of an inch advance of the conveyor or the surface to be labelled carried by the conveyor and these output counts are fed out on line 110.

Also as explained, the circuit 102 is arranged to output only the forward counts exceeding any backward counts that might be created by any chattering of the encoder, as it is incremented by movement of the conveyor.

The start or home pulse is put out from the detector 102 on line 112 to the computer 14 to provide the reference pulse for the input data. The home pulse is also fed on line 114 to an optional folder edge compensator 116 whose function is hereinafter explained.

The forward counts from the quad detector and antiback-up circuit 102 which are put out on line 110 are delivered upwardly on line 120 to the computer control 14 at input 122 and to the optional folder edge compensator 116 at input 124. These output pulses are also delivered to an accelerator ramp 126 at input 128 and to a pair of AND gates 130 and 132.

The output pulses from line 110 are also fed downwardly on line 134 as shown in FIG. 14 to a decelerator lamp 136.

Associated with the accelerator ramp 126 is a control latch 138 and associated with the decelerator ramp 136 is a control latch 140.

Associated with the computer 14 is a folder present sensor 142 shown on FIG. 1 as a light source **143*a* and a detector 143*b*** to detect the presence of a folder on a conveyor. It will be understood that if a folder should fail to feed or be present on the conveyor then the system must await the arrival of the next folder in order to function.

Assuming a folder is present and that it is desired to apply a label so that its touch down is at count 5000 after a home count in accordance with the input data of the computer 14, a place-label or instruct-to-label signal will be output on line 144 from the computer at the appropriate count and ignoring for the moment the folder edge compensator 116, that is, with switch 146 turned to the dotted line position of FIG. 14, the output pulses from line 144 will be fed to the latch 138 on line 148. This pulse turns the accelerator on, that is, output Q on and takes off the reset $\overline{Q}$. With Q on the latch 138 is DC coupled to AND gate 150 and the accelerator ramp 126 is enabled to respond to the forward counts put on on line 118 and input to the accelerator ramp at 128.

The accelerator ramp 126 puts its output pulses out on line 152 to AND gate 150.

As will be understood the accelerator ramp is a circuit which progressively increases the rate of output pulses in response to the input pulses until the output pulses are in step with the input pulses after which the accelerator outputs an END pulse output on line 154. This END pulse output is delivered by line 156 through OR gate 158 to latch 138 resetting the latch, turning the accelerator off, and removing the DC coupling to AND gate 150. At the same time the output pulse is delivered on line 160 to run on latch 162 which is DC coupled to AND gates 130 and 132.

Considering the sequence of events at this stage it will be understood that with the latch 126 actuated by the instruct-to-label output from the computer 14 on the line 144 the AND gate 150 will allow the output pulses from the accelerator 126 on line 152 to pass therethrough to the OR gate 164 to an up/down counter 166 at input UP2. The up/down counter 166 is connected to a digital to analog converter 168 which is connected to the servo amplifier 170 of the servo motor 9 through a proportional plus integrating circuit 172.

The servo amplifier drives the servo motor which in turn drives a tachometer 174 which provides feedback to the servo amplifier to assist in speed regulation.

It will be understood that as the pulses or counts commence coming into the plus/minus or up/down counter 166 there will be an output to the digital to analog converter which converts the output count to a voltage whose magnitude and direction is determined by the output count from the counter. This voltage which is accentuated through the proportional plus integrator circuit 172 provides voltage to the servo amplifier 170 to drive the servo motor. The servo motor in turn drives its encoder 10 which puts out pulses on channel A′ and B′ to the dual detector 102′ which delivers its output count on line 176 to counter 166. These counts are down count input to the counter at DN and they subtract from the input counts through AND gate 150 to UP 2. Thus, the output of counter 166 is determined by the difference between the arriving counts from the accelerator ramp and the counts arriving from the servo motor encoder's dual detector output 102'. As the rate or incoming counts at UP 2 increases and keeps moving ahead of the count rate coming from the servo motor encoder through its detector, the servo motor speed will similarly increase until the input pulses from the accelerator match the output pulses produced from the conveyor encoder 8 whereupon the pulse rate from the accelerator is constant. In response to servo motor will be brought up to speed and its speed than held constant assuming conveyor speed is constant so that the pulse output derived from its encoder will match the output pulses derived from the conveyor encoder. In other words, the servo motor will now be driving the labeller to produce a label feed of 1/1000 of an inch for each one thousandths of an inch feed of the folder or surface to be labelled carried by the conveyor.

It will be appreciated that if the servo motor tends to fall behind in its speed the incoming pulses on UP 2 at the counter 166 will produce a positive voltage to increase the servo motor speed through the digital to analog converter 168, proportional plus integrator circuit 172, and servo amplifier 170.

On the other hand, if the servo motor should run ahead of the incoming count on UP 2 at the counter, it will output reverse counts on line 178 which are input to the counter 166 at UP 3 which will provide a negative output from the counter to effect a slowing of the servo motor.

It has been found that with commercially available circuitry the accelerator ramp can be programmed to bring the servo motor up to speed so that a label to be dispensed can be brought from stationary condition up to the surface speed of the conveyor or surface to be labelled in approximately 3/16ths of an inch at a conveyor speed of 120 feet per minute.

Once the accelerator has brought the servo motor up to speed, then the accelerator puts out its END pulse output on line 154 which resets latch 138 through OR gate 158 turning the accelerator off but setting latch 162 to apply DC to gates 130 and 132 which are also connected to the forward counts from the quad detector 102.

Up to this point the decelerator ramp 136 has been quiescent and its control latch 140 has been in the reset position with minus Q on and Q off so that there has been no output on the decel "on" line 182 which is connected to AND gate 130 and to AND 132 through inverter 184.

As a result AND gate 130 is held off or is nonconducting but AND gate 132 is conductive and the output pulses from the quad detector 102 are fed through AND gate 132 through OR gate 186 to the UP 1 input of the counter 166 for label feed run on with label feed moving at the same surface speed as the folder or surface to be labelled.

It will be understood that since it takes approximately 3/16ths of an inch to bring the label feed from a stopped condition up to the speed of the surface to be labelled, the next subsequent label to be dispensed, where time permits the labeller to be stopped, must be brought to the stopped condition with its leading edge at least 3/16ths of an inch from touch down.

The accelerator ramp 126 provides the means of bringing the label from a stationary condition up to the speed of the surface to be labelled within a predetermined number of conveyor encoder output pulses or counts. The decelerator ramp 136 similarly provides for the bringing of the label feed from the same speed as the surface to be labelled to a stationary condition in a predetermined number of conveyor encoder output pulses or counts so that the next to be dispensed label can be stopped at precisely the right position for the next subsequent labelling cycle. It will be understood that the system will build into its program the provision for causing the label to touch down say at count 5000 after a home pulse to accommodate the distance required to accelerate the label from the chosen stationary position to labelling speed and to thereafter effect its touch down on the surface to be labelled.

As previously explained as labelling proceeds following the label speed reaching the speed of the surface to be labelled the sensor 60 will detect the leading edge of the next label to be dispensed. It is desired that the leading edge be sensed since there might be a label absent in the backing web 20 in which case it is required that label web feed continue to pull the web around until the leading edge of the next subsequent label that is in place is sensed. This feature also accommodates the situation where the labels are not evenly spaced on the backing and the situation where the width of the labels vary without requiring any adjustments or setting changes.

As illustrated in FIG. 14 the sensor device 60 comprising the light source 62 and the detector 64 produce an output on line 188 to a "hang-out" counter 190. This hang-out counter provides a time adjustment or delay as hereinafter more fully explained but assuming for the moment that no delay is required the hang-out counter can be ignored for purposes of the explanation. In this case the output pulse on line 188 is fed via line 192 to the decelerator latch 140 to set the latch with Q or decel on and minus Q which is normally DC coupled to the decelerator ramp 136 through line 194 off. At the same time the output pulse on line 192 is applied through OR gate 196 to reset latch 162 which turns off label run on through AND gate 132. That is, shutting off AND gate 132 interrupts the direct feed of the conveyor encoder counts output from the quad detector 102 to the up/down counter 166.

With the decel on signal latch 140 is DC coupled to AND gate 198 which is also connected through line 200 to receive the output pulses from the decelerator ramp 136.

The decelerator ramp 136 is the reverse of the accelerator ramp 126 responding to the quad detector output counts arriving on line 134 to output counts on line 200 at a decreasing rate so that after a predetermined number of conveyor encoder input counts the decelerator output counts will be brought to zero. These progressively decreasing counts are fed via AND gate 198 and OR gate 186 to the input UP 1 of the counter 166 to produce a progressively decreasing servo motor speed until the servo motor is brought to a stopped condition.

It will be understood that as the counts arriving from the decelerator at the counter 166 are decreasing the output from the servo motor encoder will produce counts which will produce an output from the counter that will be in a direction and quantity by which the servo motor encoder counts are at a higher rate that the decelerator counts to produce an output voltage from the digital to analog converter 168 to effect a slowing of the servo motor through the proportional plus integral circuit 172 and servo amplifier 170.

The control circuit makes provision for the circumstances in which there is not time enough to bring the labeller servo motor and hence label feed to a halt and start it up again and bring it back to labelling speed between instruct-to-label signals from the computer 14. To meet this situation it will be seen that should the labeller not be stopped and the next instruct-to-label or place-label signal is output from the computer 14 through line 144 the accelerator will again be turned on through latch 138. Accelerator 126 will then output its pulses through AND gate 150 and OR gate 164 to the counter input UP 2 and these pulses will go in at an increasing count along with the decreasing count of pulses being delivered from the decelerator ramp 136 and these counts will be summed to effect control of the servo motor. For example, if the incoming accelerator pulses and decelerator pulses should sum up to equal the pulse count being delivered from the conveyor encoder via its quad detector 102 the labeller would maintain speed and would deposit labels on the surface at the same separation they occupied on the backing.

It will be understood that when the decelerator ramp has brought its output to zero it will output an END pulse on line 202 which will reset or turn off latch 140 and disconnect the latch from the AND gate 198 and 130.

If the spacing of the placement of the labels is greater than the spacing of the labels on their backing, it will be understood that the system described will enable the labeller to slow down and then accelerate under the control of the decel and excel ramp to effect the appropriate label placement.

The hang-out counter 190 provides a vernier control for the start position or hang-out of the labels and also a means whereby the labels may be placed on the surface to be labelled at a spacing closer than they occupy on the label backing or web 20. In this connection the hang-out counter is simply a delay circuit which is clocked on line 204 from the output pulses of the dual detector 102' which at labelling speed is in synchronism with the output pulses from the quad detector 102. Thumb wheel switches indicated at **206*a*, 206*b*, and 206*c* provide a means for setting the time delay between the time when the label is sensed by the sensor comprised by the light source 62 and 64 and the output signal delivered on line 192 on the decel ramp. This delay will effect feed of the label for the increment of delay set towards its touch down point to bring it to the desired distance from touch down at its stopped position, that is, the position from which it starts up on the next instruct-to-label signal from the computer 14**. It will be appreciated that the label should be maintained at least 3/16ths of an inch away from touch down so that it can be brought up to label speed before touch down.

By setting 100 on the thumb wheel switches **206*a*, 206*b*, 206*c*,** the label will be advanced 100/1000ths of an inch from its position it would otherwise occupy in the stopped condition if the hang-out counter was not used. In this way the hang-out counter provides a fine adjustment control of label touch down i.e. a vernier control.

In this connection it will be appreciated that if a second instruct-to-label or place-label signal is delivered to the accelerator latch 138 before the delayed end-to-label signal is delivered from the hang-out counter 190 to the decelerator latch 140 which resets the run on latch 162 there will be a period of time in which the run on counts directly from the detector 102 will be delivered through AND gate 132 and OR gate 186 to counter input UP 1 and accelerator pulses will also be delivered through AND gate 150 and OR gate 164 to counter input UP 2 so that the servo motor speed will actually exceed the speed of the conveyor by virtue of the summation of the pulses. When the end-label pulse that has been delayed by the hang-out counter does arrive it will render AND gate 132 non-conductive but the accelerating pulses through AND gate 150 and the decelerating pulses through AND gate 198 will add and when the accelerator has completed its acceleration and has turned itself off with an END pulse output on line 154 it will set the run on latch 162 in the run on position which will render AND gate 130 conductive since the decel latch 140 is now still in the on position along with latch 162 and the output counts from the quad detector 102 can feed through AND gate 130 and OR gate 164 to the counter input UP 2 while the decel pulses are still being delivered through AND gate 198 and OR gate 186 through the counter input UP 1.

As soon as the deceleration is completed the decel ramp will shut itself off, AND gate 198 will be rendered non-conductive as will AND gate 130 but AND gate 132 will now be conductive to have the run on count from the quad detector 102 fed directly through to counter input UP 1 to bring the servo motor into synchronism with the speed of the conveyor and hence the speed of the surface to be labelled.

It will be appreciated that the crowding of the labels on the surface to be labelled relative to their spacing on the backing will be limited to such that at touch down the system has brought the label speed back to the same speed as the surface to be labelled.

With the explanation given above crowding of the labels can be accomplished when the accelerator and decelerator ramps provide the same rates of acceleration and deceleration. However, it will be understood that another means of applying labels at a closer spacing than they occupy on the backing is to make the accelerator ramp steeper than the decelerator ramp.

The folder edge compensator 116 provides for compensation when the back of the folder is not located fully home in the gripper jaws 5. This compensator provides for the maximum error that can be tolerated and utilizes a folder edge sensor generally designated at 208 comprising a light source **209*a* and a light sensor 209*b* which detects the light from the source 209*a*. The sensor is located so that as the edge of the folder is advanced it is passed between the light source 209*a* and the detector 209*b*** to provide a positive signal of the arrival of the folder edge at a predetermined point.

In operation of the folder edge compensator 116, the switch 146 is in its solid line position and the computer control 14 is programmed to deliver its instruct-to-label or place-label signal, say 125 counts ahead of the position it would otherwise give if the signal were fed directly to the accelerator latch 138. Following delivery of the instruct-to-label signal to the compensator 116, the compensator which receives its reference point each labelling cycle from the conveyor encoder home signal via line 114 and is under the clocking of the forward counts from the quad detector 102 via line 124 counts down towards zero until an input signal is delivered from the folder edge sensor 208 at which time the instruct-to-label signal is output at line 210 from the compensator through switch 146 to the accelerator latch 138.

If the file folder were fully at home in its gripper jaws then the folder edge sensor 208 would output its instruct to label signal with the count down from 125 reaching zero. Any displacement of the file folder from its fully home position would result in an instruct to label signal being output from the compensator 116 between count zero and count 125 with the maximum error permissible being when the file folder is displaced one-eighth of an inch forwardly from its correct seat in the grippers in which event the folder edge sensor 208 would put out its instruct-to-label signal coincident with the input signal from the computer control 14. To set the system upon switch on of power, the various power on reset inputs (OR) are provided as indicated in FIG. 14.

Figure 13:
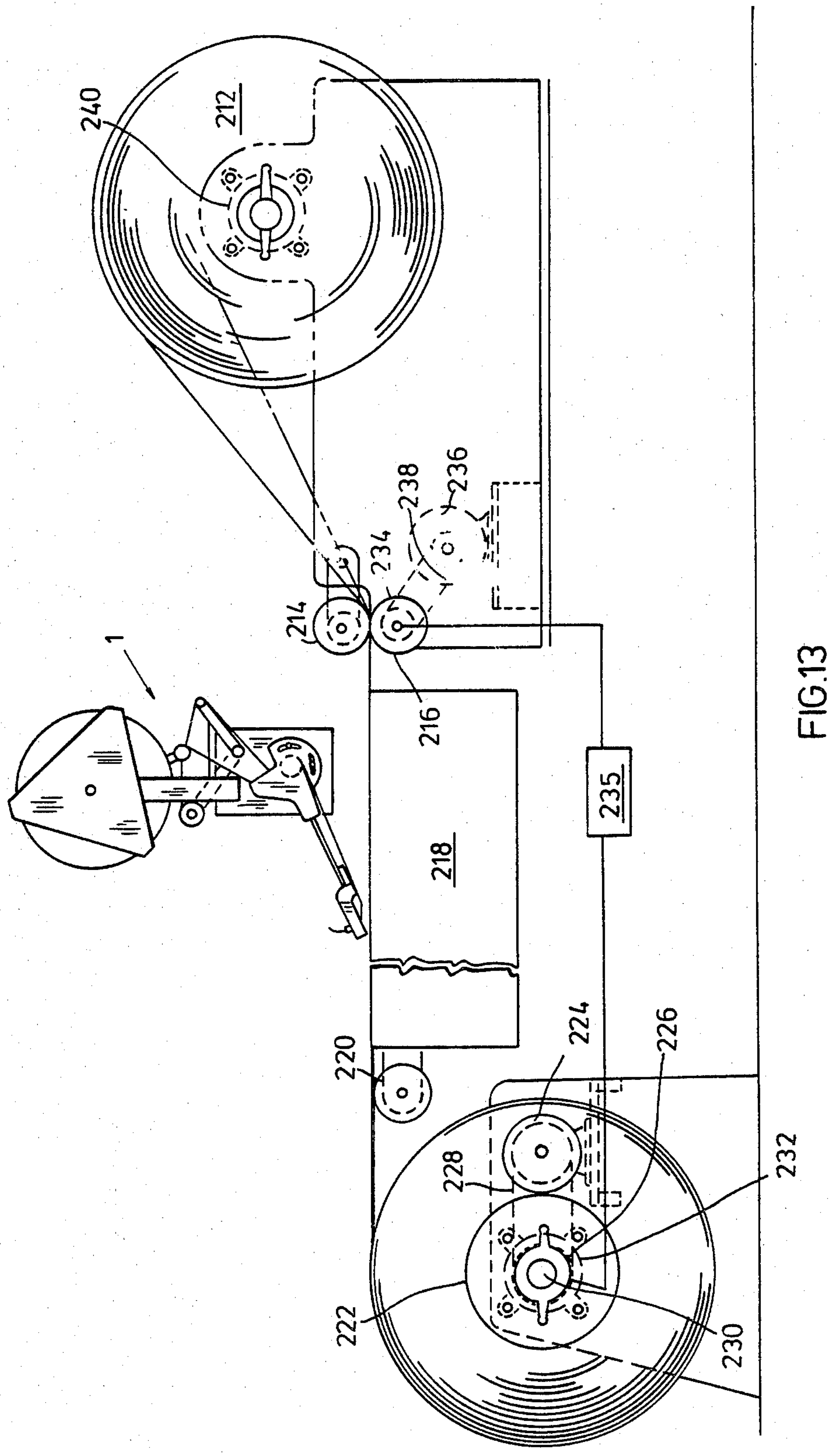
FIG. 13 is a simplified partly broken away elevational view showing the labelling apparatus of the present invention arranged to apply labels to a continuously fed web rather than to discrete items such as file folders as shown in FIG. 1.

The labeller functioning has been described with respect to the feed of discrete items such as file folders on a conveyor according to FIG. 1. It will be understood however that the invention is equally applicable to applying labels to a moving web that is continuously fed beneath the labeller as illustrated in FIG. 13. In this application of the labeller the web to which the labels are to be applied is fed from a supply roll 212 between pinch rolls 214 and 216 across a support table 218 beneath the labeller 1 and over an idler roll 220 to a take up reel 222 rotatably mounted at the opposite end of the support table 218 from the supply wheel 212.

It is desired that the web speed be maintained constant and to this end the take up reel is driven by a rewind motor 224 which drives a particle clutch 226 through belt 228. The power applied to the particle clutch 226 will determine the drive through to the rewind shaft 230 to which the take up reel 222 is affixed. It will be understood that as the take up reel rotates and accumulates the web it will be necessary to constantly diminish the RPM of the take up reel as its diameter increase in order to maintain constant web speed beneath the labeller 1. To this end a take up encoder indicated at 232 is affixed to the driven rewind shaft 230 to monitor the take up reel RPM.

Driven by one of the pinch rolls 216 is a web speed encoder 234 which corresponds to the conveyor encoder 8 to produce a home pulse once each revolution and output pulses every one-thousandth of an inch.

The encoder 234 also serves an additional function in that it interacts with the take up encoder 232 through a suitable controller 235 which may be part of the computer 14, the arrangement being such that as the take up reel or roll 222 increases in diameter its pulling torque or tension decreases which is sensed as a reduction of speed by the web speed encoder 234 which affects the application or more power through the controller 235 to the particle clutch 226 to increase the torque on the pick up roll to increase web speed.

To assist in maintaining the balance of speed and tension of the web to maintain essentially constant web speed, a pacer drive 236 is provided which provides a drive to the pinch roll 216 through a belt 238 to act to either resist or assist web speed and tension in conjunction with the interplay between the take up encoder 232 and the web speed encoder 234 to assist in the maintenance of constant web speed.

A particle brake 240 is provided for the supply reel 212 to brake the supply reel from overrunning when web feed is stopped, that is, when power is removed from the particle clutch 226.

It will be understood that the web speed encoder which measures the speed of travel of the web or surface to be labelled will control the labeller through the circuitry of FIG. 14 in precisely the manner described above for precision labelling. In this case the web may be considered as divided up into segments between home pulses and the labels can be deposited at any point between the segments as set on the computer control 14 with the label touching down at the desired count relative to the home signal while travelling at the same surface speed as the web. For example, the web may be labelled and thereafter cut and folded to form labelled file folders.

Figure 10:
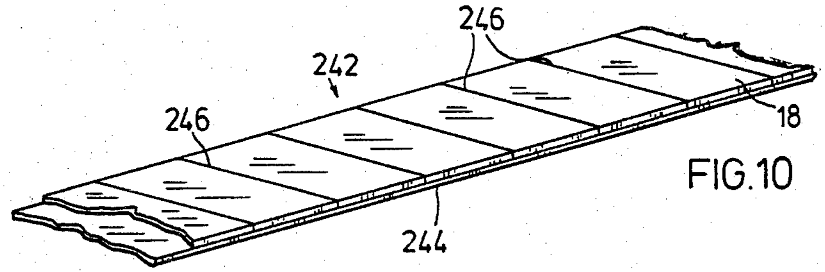
Figure 11:
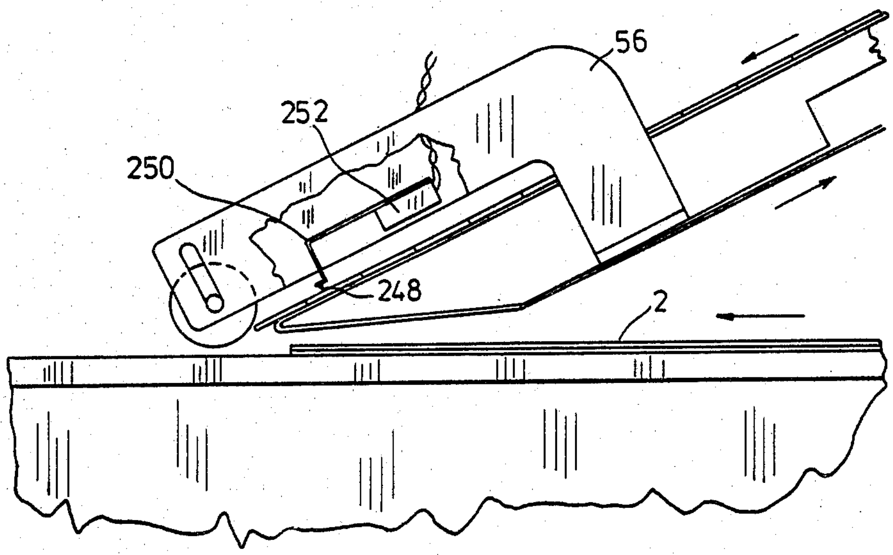
FIG. 11 is a broken away elevational view illustrating the label sensor employed with the butt cut labels.
Figure 12:
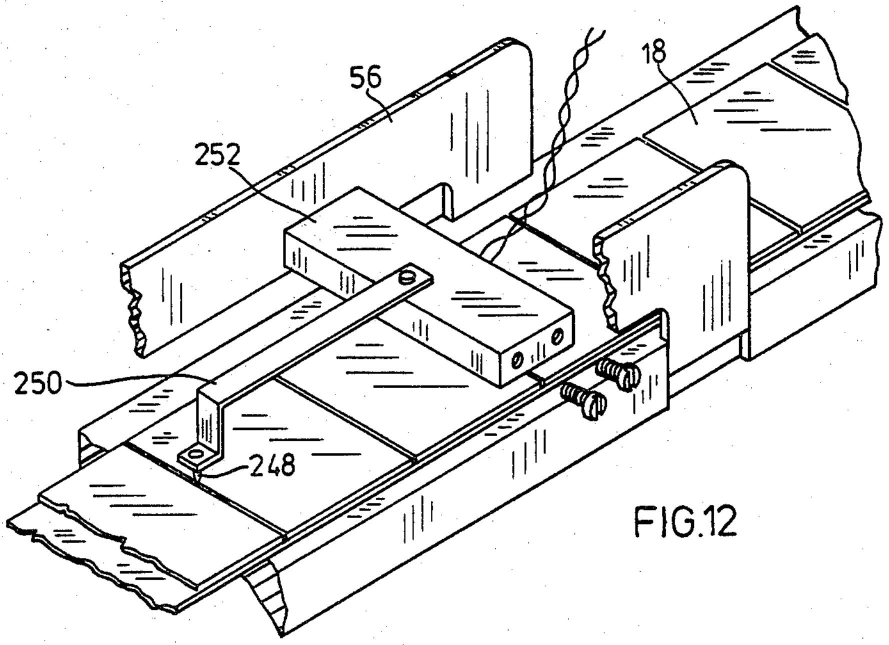
FIG. 12 is a broken away perspective view of the label sensor of FIG. 11.

While the labeller 1 has been described as dispensing labels 18 adhered in spaced apart relation on the backing web 20, the labeller may also dispense butt cut labels as illustrated in FIGS. 10 to 12 inclusive. In the case of the butt cut labels a continuous strip of labelling material 242 having a self-adhesive backing is applied to a backing web or strip 244. As with the labels 18 and backing web 20 a suitable release coat will be provided between the labelling strip 242 and the web 244 so that the labels can be peeled from the backing web. The individual labels are formed by cutting through the labelling strip along the lines 246, that is, the individual labels are formed by butt cutting through to the backing web while the backing web per se remains intact. The butt cut labels do not require the step of die cutting and stripping between the individual labels 18 during manufacture so that the cost of preparing the labels is substantially less when they are butt cut as illustrated in FIG. 10. In addition, there is no variation in the spacing between labels due to the inaccuracy of placing them on the backing web although any inaccuracy in the label placement or as explained even the absence of a label is controlled in the previously described labelling application by virtue of the sensor 60 sensing the leading edge of the next label to be dispensed. With the butt cut labels however the sensor 60 is not applicable and instead the sensing of the next label to be dispensed is done by a needle 248 which rides on the butt cut labels and drops into the cut under action of a spring support arm 250 carried by the sensor 252 which records the drop of a needle into the butt cut to produce the end-labelling signal to the decelerator 136. Again, this signal may be delayed by the hang-out control 190 to adjust the hang-out or projection of the label beyond the end of the splitter tongue 40 to adjust the distance between the start position of the label and its point of touch down as previously described. Otherwise the labeller is controlled as previously described with reference to the control circuit of FIG. 14.

While the labeller of the present invention particularly lends itself to computer control the fact that the servo motor 9 is accelerated smoothly up to speed in a predetermined distance of travel of the surface to be labelled and similarly is decelerated smoothly to bring the next to be dispensed label accurately to the desired starting point without the mechanical limitations of start/stop clutch and brake mechanism makes the labeller highly advantageous for even simple labelling applications. These advantages include long life operation, increased labelling speed and accuracy both with respect to the point of label touch down and with the synchronizing of the label speed with the speed of the surface to be labelled. In such a simple application, for example, the instruct-to-label signal could be taken directly from a feed sensor such as the folder edge sensor 208 where the sensed items are all to be labelled in the same way.

It will be appreciated that since the accelerator ramp is actuated in response to the conveyor encoder output pulses the ramp will automatically follow conveyor speed at whatever speed the conveyor is operated. Similarly, the decelerator ramp will also automatically follow the conveyor speed. Again, the run on speed of the labeller is controlled directly from the conveyor encoder output counts so that it is automatically synchronized with the conveyor speed.

Other applications of the labeller of the present invention where the precision and speed of labelling afforded thereby will be apparent to those skilled in the art. It will also be understood that various modifications and alterations may be made utilizing the principles of the present invention without departing from the spirit of the invention or scope of the appended claims.

I claim:

1. In a labeller actuated to advance and dispense labels by a rotary drive onto a surface fed therepast, a servo motor for actuating said labeller drive and a control system for said servo motor, said system having means adapted to respond to the rate of feed of a surface to be labelled to accelerate the servo motor from zero to the desired labelling speed corresponding to the rate of feed of the surface to be labelled while the surface to be labelled is advanced towards the labeller a predetermined distance, and means to decelerate the servo motor from labelling speed to zero while label feed is advanced a predetermined distance, the system being adapted so that upon a label instructing signal being fed to the control system at a preselected point of advance of the surface towards the labeller, the labeller will accelerate a label from a predetermined start position and deliver same to touch down on the surface to be labelled at the precise desired point with the label moving at the same speed as the surface and upon a label feed sensing signal generated by label feed being fed to the control system the labeller will decelerate to bring the next label to be delivered to said predetermined start position in preparation for the next label instructing signal.

2. In a labeller as claimed in claim 1, said control system for said servo motor includes a surface feed responsive pulse generator to be driven by feed of the surface to be labelled to produce pulses representative of predetermined increments of travel of said surface, a label feed responsive pulse generator driven by the servo motor, counter means responsive to pulses derived from said surface feed responsive pulse generator and their count relative to the count of pulses generated by said label feed responsive pulse generator to produce a servo motor speed controlling output, means responsive to said counter output for driving said servo motor, and an accelerator ramp interposed between said first mentioned pulse generator and said counter means and adapted to be rendered operative upon receipt of a label instruction signal to apply output pulses in response to input pulses from said first mentioned pulse generator at a progressively increasing rate to said counter means until the accelerator output pulse rate equals the input pulse rate of said first mentioned pulse generator and means to thereafter effect bypass of the accelerator ramp to connect said first mentioned pulse generator pulses directly to said counter means.

3. In a labeller as claimed in claim 2 in which said first mentioned pulse generator produces a home pulse and labelling data storing means responsive to the pulses of said first mentioned pulse generator are provided to respond to deliver said label instructing signal at a predetemined number of pulses following said home pulse according to the labelling scheme stored in said data storing means.

4. In a labeller as claimed in claim 2 or 3 in which said means to decelerate the servo motor comprises a decelerator ramp interposed between said first mentioned pulse generator and said counter means.

5. In a labeller as claimed in claim 2 or 3 in which said means to decelerate said servo motor comprises a decelerator ramp interposed between said first mentioned pulse generator and said counter means, means blocking operation of said decelerator ramp until a label feed sensing signal is received and sensing means for generating said label feed sensing signal upon label feed to deactivate said blocking means and to direct the pulses of said first mentioned pulse generator to said counter means through said decelerator ramp to progressively bring label speed to zero.

6. In a labeller of the type in which labels with self adhesive backings are mounted on a backing web which is fed from a feed supply to a take-up with the labels being dispensed by drawing the web around a peeling surface, whereby the labels being stiffer than the backing web are separated from the web and are moved to touch down on a surface to be labelled being fed thereby, a servo motor for driving said label backing web to advance the labels mounted thereon, a first pulse generator adapted to be driven from the feed of a surface to be labelled and generating pulses representative of predetemined increments of surface advance, a pulse generator connected to said servo motor to produce pulses representative of predetermined increments of label advance which are equal to the increments of surface advance and control means for said servo motor operable upon receiving an instructing signal to label delivered at a preselected point of surface advance towards the labeller to accelerate said servo motor up to speed so that the pulse output of said second pulse generator matches the pulse output of said first pulse generator whereby in operation the label to be dispensed which is stationarily located at a predetermined start position relative to said peeling surface is brought up to the speed of the surface to be labelled for touch down of the label at a predetemined point on the surface with the label and surface moving at the same speed, and decelerator means responsive to label feed following touch down of the label being dispensed operable, in the absence of a further label instructing signal to feed the next subsequent label, to decelerate said servo motor to bring said next subsequent label to be dispensed to rest at said predetermined start position.

7. In a labeller as claimed in claim 6 in which said servo motor control means has further means responsive to an instruct to label signal delivered while said decelerator means is operating to decelerate said servo motor to override said decelerator means and control the speed of the next subsequent label to effect its touch down at the selected point as called for by said last mentioned instructing signal with the label speed equal to the surface speed.

8. In a labeller in which a rotary drive is translated into label feed to apply a label to a surface being fed thereby, a servo motor for driving said rotary drive, a first encoder to be driven by the feed of the surface to be labelled to produce output pulses corresponding to predetermined increments of surface feed, a second encoder driven by said servo motor and producing output pulses corresponding to predetermined increments of label feed which are equal to said predetermined increments of surface feed, and a speed control system for said servo motor, said speed control system comprising means for driving said servo motor in response to pulses derived from said first encoder and their count relative to the count of pulses generated by said second encoder and comprising counter means connected directly to said second encoder, a labelling control system interposed between said first encoder and said counter means, said labelling control system comprising an accelerator, means responsive to input data to produce an instruct to label signal after a predetermined number of first encoder pulses following a home pulse to activate said accelerator, said accelerator being connected to receive input pulses from said first encoder to produce output pulses in response thereto at a progressively increasing rate until the accelerator output pulse are in step with the encoder input pulses, said accelerator being connected to apply its output pulses to said counter means until after its output pulses are in step with its encoder input pulse means and to thereafter connect said first encoder pulses directly to said counter and deactivate said accelerator, a decelerator connected to receive input pulses from said first encoder to produce output pulses and apply them to said counter at a progressively decreasing rate until stopped, and means responsive to label feed for activating said decelerator and disconnecting said first encoder from said counter.

9. A labeller as claimed in claim 8 in which said accelerator brings its output pulse rate up to the input pulse rate in a predetermined number of input pulses corresponding to a predetermined distance of feed of the surface to be labelled.

10. A labeller as claimed in claim 9 in which said decelerator brings its output pulse rate to zero in a predetermined number of input pulses corresponding to a predetermined distance of label feed.

11. A labeller as claimed in claim 10 in which said counter is arranged to accept and sum counts from said decelerator and said accelerator to prevent stoppage of label feed in the event a subsequent instruct to label signal to place a subsequent label arrives before the decelerator pulse rate has been brought to zero.

12. A labeller as claimed in claim 11 in which alternate path means are provided for said first encoder pulses to the counter following operation of the accelerator in the event the decelerator is activated in response to said label feed sensing means after the arrival at the accelerator of a subsequent instruct to label signal to place a subsequent label.

13. In a labeller in which a rotary drive is translated into label feed to dispense a label onto a surface being fed therepast, a servo motor for driving said rotary drive, a first surface feed measuring encoder to be driven by the feed of the surface to be labelled to produce pulses corresponding to predetermined increments of surface feed, a second label feed measuring encoder driven by said servo motor and producing pulses corresponding to predetermined increments of label feed which are equal to said predetermined increments of surface feed, a speed control system for said servo motor, and a labelling control system for controlling said speed control system, said speed control system comprising an up/down counter connected to said first encoder through said labelling control system to count pulses output from said labelling control system and connected to count directly the output pulses of said second servo motor encoder, the arrangement being such that said counter produces an output proportionate to the difference in the number of counts received from said second encoder and from said labelling control system which is in one direction when the labelling control system counts are greater than the servo motor encode counts and in the opposite direction when the servo motor encode counts are greater than the labelling control system counts, a digital to analog converter operatively connected to said counter to produce an output voltage having a magnitude and polarity corresponding to the magnitude and direction of the counter output, a servo amplifier for driving said servo motor, means operatively connecting said digital to analog converter to said servo amplifier, the arrangement being such that said servo motor is driven in a manner such as to effectively match the count of the output pulses from said second servo motor encoder to the count of the pulse from said labelling control system delivered to said counter, said labelling control system comprising an accelerator, means responsive to an instruct to label signal to activate said accelerator, said accelerator being connected to receive input pulses from said first encoder to produce output pulses in response thereto at a progressively increasing rate until the accelerator output pulse are in step with the first encoder input pulses, said accelerator being connected to apply its output pulses to said counter until after its output pulses are in step with its first encoder input pulse, means activated subsequent to said accelerator output pulses reaching in step relation with its first encoder input pulses to thereafter connect said first encoder pulses directly to said counter and deactivate said accelerator, a decelerator connected to receive input pulses from said first encoder to produce output pulses and apply them to said counter at a progressively decreasing rate until stopped, and means responsive to label feed for activating said decelerator and deactivating said means connecting said surface feed first encoder directly to said counter.

14. A labeller as claimed in claim 13 in which said means operatively connecting said digital to analog converter to said servo amplifier comprises a proportional plus integrator.

15. A labeller as claimed in claim 13 or 14 in which said first encoder produces a home signal referenced to the surface to be labelled and means are provided to produce said instruct to label signal after a predetermined number of first encoder pulses following said home pulse.

16. In a labeller of the type in which labels with self adhesive backings are mounted on a backing web which is fed from a supply to a take-up with the labels being dispensed by drawing the web around a peeling surface whereby the labels being stiffer than the backing web are separated from the web and are moved to touch down on a surface to be labeled being fed past the labeller, a surface feed measuring encoder to be driven by the feed of the surface to be labelled to produce pulses corresponding to predetermined increments of surface feed, a servo motor for driving said label backing web to advance the labels mounted thereon, a label feed measuring encoder driven by said servo motor and producing pulses corresponding to predetermined increments of label feed which are equal to said predetermined increments of surface feed, a speed control system for said servo motor and a labelling control system for controlling said speed control system, said speed control system comprising an up-down counter connected to count directly the output pulses of said servo motor encoder and connected to said surface feed measuring encoder through said labelling control system, the arrangement being such that said counter produces an output proportionate to the difference in the number of counts received from said servo motor encoder and from said labelling control system which is in one direction when the labelling control system counts are greater than the servo motor encoder counts and in the opposite direction when the servo motor encoder counts are greater than the labelling control system counts, a digital to analog converter operatively connected to said counter to produce an output voltage having a magnitude and polarity corresponding to the magnitude and direction of the counter output, a servo amplifier for driving said servo motor, said servo amplifier being responsive to said output voltage to produce a servo motor speed such as to effectively match the count of the output pulses from said servo motor encoder to the count of the pulses from said labelling control system delivered to said counter, said labelling control system comprising an accelerator, means responsive to input data to produce an instruct to label signal after a predetermined number of surface feed encoder pulses following a home pulse to activate said accelerator, said accelerator being connected to receive input pulses from said surface feed encoder to produce output pulses in response thereto at a progressively increasing rate until the accelerator output pulses are in step with the encoder input pulses, said accelerator being connected to apply its output pulses to said counter until after its output pulses are in step with the encoder input pulses, means activated subsequent to said accelerator output pulses reaching in step relation with its encoder input pulses connect said surface feed encoder directly to said counter and deactivate said accelerator, a decelerator connected to receive input pulses from said surface feed encoder to produce output pulses and apply them to said counter at a progressively decreasing rate until stopped, and means responsive to label feed for activating said decelerator and deactivating said means connecting said surface feed encoder directly to said counter.

17. A labeller as claimed in claim 16 in which the output voltage from said digital to analog converter is applied to said servo amplifier through a proportional plus integrating circuit.

18. A labeller as claimed in claim 17 in which said servo motor drives a tachometer which provides a stabilizing feedback to said servo motor.

19. A labeller as claimed in claim 16, 17 or 18 in which said labelling control system is arranged to provide pulse counts to said counter from both said accelerator and decelerator in the event a second instruct to label signal is received by said accelerator before the counts from said decelerator have stopped to initiate feed of the subsequent label whereby labels may be placed on a surface to be labelled with at least as close a spacing as their spacing on said backing.

20. A labeller as claimed in claim 16, 17 or 18 in which said labelling control system is arranged to provide pulse counts to said counter from both said accelerator and said surface feed encoder in the event a second instruct to label signal is received by said accelerator before the label feed sensing signal arrives to turn on said decelerator whereby labels may be placed on a surface to be labelled at a closer spacing their than spacing on said backing.

21. Labelling apparatus comprising a labeller actuated by a rotary drive label feed, sensing means for providing an end label feed signal following dispensing of a label, means to feed a surface to be labelled at a constant speed past said labeller, a first encoder driven by said surface speed means and producing output pulses following a home pulse corresponding to predetermined increments of surface feed, means for providing an instruct to label signal at a predetermined number of pulses after said home pulse, a servo motor for driving the rotary drive of said labeller, a second encoder driven by said servo motor and producing output pulses corresponding to predetermined increments of label feed equal to said predetermined increments of surface speed, a speed control system for said servo motor and a labelling control system for controlling said speed control system, the arrangement being such that upon an instruct to label signal being given at said preselected number of pulses of said first encoder following said home pulse said labelling control system operates to control said speed control system to progressively accelerate said servo motor from a stationary condition to bring said second servo motor encoder pulses into synchronism with said first encoder pulses after a predetermined number of first encoder pulses to dispense a label into said surface at said predetermined point with the label travelling at the same speed as the surface to be labelled, and upon an end label feed signal being given by said label feed sensing means said labelling control system operates to control said speed control system to progressively decelerate said servo motor back to said stationary condition after a predetermined number of first encoder pulses.

22. Labelling apparatus as claimed in claim 21 in which said means to feed a surface is a conveyor and said first encoder is driven by said conveyor.

23. Labelling apparatus as claimed in claim 21 in which said surface is a continuous web and means are provided to drive said continuous web past said labeller at a constant speed.

24. Labelling apparatus as claimed in claim 22 in which said label control system controls said speed control system to override said decelerator upon a second instruct to label signal arriving requiring the dispensing of a second label travelling at the same speed as the surface to labelling at a point sufficiently adjacent to the previously dispensed label such that there is not time to decelerate the servo motor at least to a stop.

25. Apparatus for applying labels to a surface to be labelled in accordance with a predetermined scheme comprising a labeller adapted to dispense labels with self-adhesive backings mounted on a backing web, the labels having a stiffness greater than said web, said labeller providing a downwardly inclined label feed path terminating in a peeling surface, rotary driven means for drawing the web around said peeling surface and return same to a take up roll whereby the labels being stiffer than said web progressively separate from said web and continue their downwardly inclined travel at web speed until the leading label edge touches down on a surface to be labelled being fed beneath said delivery ramp in the direction of label feed, means for feeding a surface to be labelled beneath said peeling surface to receive a label, a first encoder driven by said surface means and producing a home pulse representative of a start position of a predetermined feed cycle of said surface feed means and a predetermined number of feed advance measuring pulses between the difference in the number of pulses received from said labelling control system and said second encoder to drive said servo motor to reduce the difference to zero, the arrangement being such that the servo motor is operated to dispense a label so that it touches down at the requisite predetermined point on the surface to be labelled with the label and surface travelling at the same speed, and thereafter label feed is brought to zero with the next subsequent label in position for dispensing when called for by said data input controller.

26. Apparatus as claimed in claim 25 in which said means for feeding a surface to be labelled comprises an endless conveyor for conveying at desired predetermined fixed spacing file folders and like items to be labelled.

27. Apparatus as claimed in claim 25 in which said surface to be labelled comprises a continuous web of material and means to feed said web at a constant speed beneath said ramp; said first encoder being driven by said web.

28. Apparatus as claimed in claim 26 in which said means for feeding a surface to be labelled comprises an endless conveyor for conveying at desired predetermined fixed spacing file folders and the like to be labelled each having a discreet edge, means for sensing said edge for detecting any shift of position thereof from said desired predetermined fixed spacing, home pulses of sequential feed cycles, said feed advance measuring pulses corresponding to predetermined equal increments of feed of the surface to be labelled, a servo motor for driving said labeller rotary drive, a second encoder driven by said servo motor and producing pulses corresponding to predetermined equal increments of label feed which are equal to said predetermined increments of surface feed, a speed control system for said servo motor operatively connected to said second encoder, a labelling control system for said speed control system, said first encoder being operatively connected to said speed control system through said labelling control system, and a data input controller operatively connected to said first encoder and adapted to receive data as to the desired point of label application following a home pulse from said first encoder, said data input controller being connected to said labelling control system to actuate same in accordance with input data to effect the desired label application, said labelling control system having accelerator means operable upon actuation by said data input controller to produce output pulses derived from said first encoder and applied to said speed control system at a progressively increasing rate until they are in synchronism with the pulses of said first encoder and to thereafter directly connect said first encoder pulses to said speed control system, decelerator means, and means responsive to label feed to disconnect said first encoder from said speed control system and to actuate said decelerator means to produce output pulses derived from said first encoder and applied to said speed control system at a progressively decreasing rate to zero, said speed control system having means responsive to and means responsive to said sensing means to adjust the timing of the actuation of said labelling control system by said data input controller to compensate for the shift detected.

29. Apparatus as claimed in claim 25 in which said speed means responsive to the difference in number of pulses received from said labelling control system and said second encoder to drive said servo motor comprises and up/down counter whose output is proportional to the difference in count of the pulses received from said labelling control system and received said second encoder and in a direction dependent on which such received counts are greater, a digital to analog converter operatively connected to said counter to produce an output voltage having a magnitude and polarity corresponding to the magnitude and direction of the counter output, a servo amplifier for driving said servo motor in sequence to said converter output, the arrangement being such that said servo motor is driven in a manner such as to effectively match the count of the output pulses from said servo motor encoder to the count of the pulses from said labelling control system delivered to said counter.

30. Apparatus as claimed in claim 29 in which said servo amplifier is connected to said digital to analog converter through a proportional plus integral circuit.

31. Apparatus as claimed in claim 25, 29 or 30 in which said labelling control system is adapted to accelerate label feed from zero to the same speed as the surface to be labelled after a predetermined number of first encoder pulses representatives of a predetermined distance of travel of the surface to be labelled.

32. Apparatus as claimed in claim 25, in which said labelling control system is adapted to decelerate label speed down from the speed of the surface to be labelled after a predetermined number of first encoder pulses representative of a predetermined distance of label travel.

33. Apparatus as claimed in claim 32 in which said predetermined distance of label travel is equal to said predetermined distance of travel of the surface to be labelled.

34. Apparatus as claimed in claim 25 in which said labelling control system applies pulses from said accelerator separately from pulses from said decelerator to said means responsive to the difference in the number of pulses received from said labelling control system and said second encoder whereby in the event of a second instruct to label signal being delivered to said accelerator before deceleration has been completed the driving effect on said servo motor is the different between the sum of pulses arriving from said accelerator and decelerator and sais second encoder pulses.

35. Apparatus as claimed in claim 34 in which, upon said second instruct to label signal arriving at said accelerator means coincidentally with the arrival of an end labelling signal at said decelerator means, said labeller speed is the sum of said accelerator and decelerator pulses.

36. Apparatus as claimed in claim 25 in which said means responsive to label feed comprises means to detect the leading edge of the label on said backing which is the next to be applied and operating to produce an end to label signal upon such detection and means for delivering said signal to disconnect said first encoder from direct connection with said speed control system and to actuate said decelerator means.

37. Apparatus as claimed in claim 36 in which adjustable delay means are interposed between said means detecting said leading label edge and said means for delivering said signal.

38. Apparatus as claimed in claim 37 in which means are provided to effect a second direct connection between said first encoder and sais speed control system in the event said accelerator means receives a second instruct to label signal before a delayed end to labelling signal is delivered to actuate said decelerator means whereby said servo motor is operated for a period of time corresponding to said delay above labelling speed and then returns to labelling speed for label touch down whereby labels can be applied to a surface with a spacing closer than they occupy on their backing.

39. In a labeller having a rotary drive to advance and dispense labels onto a surface being fed therepast, a servo motor for driving said labeller and a control system for said servo motor which is responsive to the rate of feed of the surface to be labelled as it is advanced to the labeller and which is adapted to accelerate the servo motor from zero to the desired labelling speed while the surface to be labelled is advanced toward the labeller a predetermined distance and which is adapted to decelerate the servo motor from labelling speed to zero while the label feed is advanced a predetermined distance.

40. A labeller as claimed in claim 39 having means responsive to the feed of said surface to be labelled to provide an instruct to label signal to activate said control system to accelerate said servo motor when the surface to be labelled has advanced towards the labeller to a point from which on continued feed it will be brought into position relative to said labeller that the label being dispensed with touch down on said surface at the desired point of touch down.

41. A labeller as claimed in claim 40 in which said instruct-to-label means comprises a computer having labelling input data stored therein for delivery to said control system.

42. A labeller as claimed in claim 41 in which surface feed sensing means are provided interposed between said computer and said control system to provide a delay in said instruct to label signal to accommodate mispositioning of said surface to be labelled longitudinally of its feed path to the labeller.

43. A labeller as claimed in claim 39 having label sensing means to provide an end labelling signal to said control system to effect deceleration of said servo motor.

44. A labeller as claimed in claim 43 in which said label sensing means senses the leading edge of the next sequence label to be dispensed.

45. A labeller as claimed in claims 43 or 44 in which an adjustable signal delay circuit is interposed between said label sensing means and said control system.

46. A labeller as claimed in claim 39, 40 or 43 in which said control system includes an accelerator to effect servo motor acceleration which is accelerated under control of the feed of the surface to be labelled and is governed by the rate of feed of such surface.

47. A labeller as claimed in claim 39, 40 or 43 in which said control system includes a decelerator to effect deceleration of said servo motor which is decelerated under control of the feed of the surface being fed past the labeller and is governed by the rate of such feed.

48. A labeller as claimed in claim 39, 40 or 43 in which the predetermined distance which the label feed is advanced during deceleration of said servo motor from labelling speed to zero corresponds to a predetermined distance of surface feed.

* * * * *